United States Patent
Locker et al.

(10) Patent No.: US 10,042,440 B2
(45) Date of Patent: Aug. 7, 2018

(54) APPARATUS, SYSTEM, AND METHOD FOR TOUCH INPUT

(71) Applicant: LENOVO (Singapore) PTE. LTD., New Tech Park (SG)

(72) Inventors: Howard Locker, Cary, NC (US); Daryl Cromer, Cary, NC (US); Steven Richard Perrin, Raleigh, NC (US)

(73) Assignee: Lenovo (Singapore) PTE. LTD., New Tech Park (SG)

(*) Notice: Subject to any disclaimer, the term of this patent is extended or adjusted under 35 U.S.C. 154(b) by 114 days.

(21) Appl. No.: 14/799,458

(22) Filed: Jul. 14, 2015

(65) Prior Publication Data
US 2015/0331498 A1    Nov. 19, 2015

Related U.S. Application Data

(63) Continuation-in-part of application No. 13/430,051, filed on Mar. 26, 2012, now abandoned.

(51) Int. Cl.
G06F 3/038    (2013.01)
G06F 3/041    (2006.01)
G06F 3/01    (2006.01)
G06F 3/0481    (2013.01)

(52) U.S. Cl.
CPC .............. G06F 3/038 (2013.01); G06F 3/017 (2013.01); G06F 3/0416 (2013.01); G06F 3/04812 (2013.01)

(58) Field of Classification Search
CPC .............................. G06F 3/04812; G06F 3/044
USPC ..................... 345/173–179; 178/18.01–18.09
See application file for complete search history.

(56) References Cited

U.S. PATENT DOCUMENTS

| | | | |
|---|---|---|---|
| 5,487,145 A | 1/1996 | Marsh et al. | |
| 5,825,351 A | 10/1998 | Tam | |
| 6,034,672 A * | 3/2000 | Gaultier | G06F 3/0488 345/157 |
| 7,640,518 B2 * | 12/2009 | Forlines | G06F 3/0488 345/156 |
| 2005/0052425 A1 * | 3/2005 | Zadesky | G06F 3/0338 345/173 |
| 2006/0071915 A1 * | 4/2006 | Rehm | G06F 1/1616 345/173 |
| 2010/0262933 A1 | 10/2010 | Kim et al. | |
| 2011/0141052 A1 | 6/2011 | Bernstein et al. | |
| 2011/0181534 A1 | 7/2011 | Palacios | |

(Continued)

FOREIGN PATENT DOCUMENTS

JP    2010061224 A  *  3/2010

*Primary Examiner* — Stacy Khoo
(74) *Attorney, Agent, or Firm* — Kunzler, PC

(57) ABSTRACT

An apparatus, system, and method are disclosed for touch input. An apparatus for touch input includes a display and a touchpad that does not overlap the display. The touchpad has an absolute input mode and a relative input mode such that a location of a cursor within the display is controlled by input received while the touchpad is in an absolute and/or relative input mode. The apparatus also includes a sensor module and a display module. The sensor module detects an input object within a sensing range of the touchpad. The display module presents the cursor at a location within the display based on the input object. The location of the cursor within the display is determined according to the input mode of the touchpad.

15 Claims, 7 Drawing Sheets

(56) References Cited

U.S. PATENT DOCUMENTS

| | | | |
|---|---|---|---|
| 2011/0242750 A1* | 10/2011 | Oakley | G06F 1/1637 |
| | | | 361/679.27 |
| 2012/0169671 A1* | 7/2012 | Yasutake | G06F 3/0425 |
| | | | 345/175 |
| 2012/0218200 A1 | 8/2012 | Glazer et al. | |
| 2012/0274547 A1 | 11/2012 | Raeber et al. | |
| 2013/0002600 A1 | 1/2013 | McCracken | |

* cited by examiner

APPARATUS, SYSTEM, AND METHOD FOR TOUCH INPUT

FIELD

The subject matter disclosed herein relates to touch input and more particularly relates to providing input in a touch-optimized user interface.

BACKGROUND

Description of the Related Art

Touch-screen devices and software respond to direct contact between a finger, or other input object, and a touch-screen. Often, a user is able to manipulate and control a device by touching and/or dragging items on a screen. Such touch-screen devices and interfaces may provide a natural and intuitive feel because a user can interact with objects on screen in a manner similar to real-world physical objects. However, touch-screen interfaces often have drawbacks when it comes to entering text, drawing, or performing other functions that require fine motor control. For example, keyboards or other devices may function much better for some purposes than a touch-screen, such as entering text, manipulating small objects, etc. Additionally, touch-screen input often suffers from inaccuracy because a user's finger obstructs a user's view of the exactly location the finger is touching on screen. As such users often desire to utilize other forms of input besides touch-screen input for certain applications.

BRIEF SUMMARY

The inventors have recognized that with current touch-screen devices users often will use one operating system on a phone or tablet for some purposes and switch to a different device, such as a laptop or a desktop computer, using a different operating system for another purpose. For example, a user may access a website on a tablet device for reading and realize that the user would like to contribute to the website by typing a comment, or performing other actions. The user may find it easier to go to a different device, such as a laptop or desktop computer that includes a keyboard, to enter the text.

Switching between devices and/or operating systems can lead to significant inconvenience to a user. For example, data may be on another system may be unavailable on a specific device or operating system. Additionally, switching back and forth between different user environments leads to a greater learning curve for a user because they may be required to learn how to do the same thing in different ways on different operating systems. Thus, users may be required to perform the same action twice and/or in different ways, leading to duplication of effort or other problems when previous actions performed on one device must be duplicated on another device or system.

Based on the foregoing discussion, the inventors have recognized a need for an apparatus, system, and method that allows a user to provide input in a touch-optimized interface using conventional input devices in a more natural way. Beneficially, such an apparatus, system, and method would allow an individual to use a touchpad or other non-touch-screen touch device to provide input without significantly changing the way a user provides that input. Beneficially, the method of input may serve as an alternate form of input in a touch-optimized interface or may supplant the need for a touch-screen on a device running a touch-optimized interface.

An apparatus, in one embodiment, includes a display and a touchpad. The touchpad, in some embodiments, does not overlap the display. In a further embodiment, the touchpad includes an absolute input mode and a relative input mode. In various embodiments, the location of a cursor within the display is controlled by input received by the touchpad while in one or more of the absolute input mode and the relative input mode.

In one embodiment, the apparatus includes a sensor module that detects an input object within a sensing range of the touchpad. The apparatus, in another embodiment, includes a display module that presents the cursor at a location within the display based on the input object. In some embodiments, the location of the cursor within the display is determined according to the input mode of the touchpad.

In one embodiment, the apparatus includes a plurality of buttons operably coupled to the touchpad. In some embodiments, the plurality of buttons generate input events at the display location of the cursor while the touchpad is in a relative input mode. In some embodiments, the display and the touchpad are part of a clamshell information handling device.

In one embodiment, the sensor module further determines a site of the input object in relation to the touchpad in response to detecting the input object hovering a distance above the touchpad. In another embodiment, the determined site of the input object corresponds to an input detectable location on the touchpad. In some embodiments, the touchpad includes a plurality of input detectable locations that map 1:1 to a plurality of corresponding display locations of the display.

In some embodiments, the display module presents the cursor at a display location that corresponds to the input detectable location associated with the determined site in response to the touchpad being in an absolute input mode. In various embodiments, the apparatus includes an event generator module that generates an input event at the display location in response to the input object being within a predetermined distance of the touchpad. In some embodiments, the apparatus includes a mode module that changes the input mode of the touchpad from a relative input mode to an absolute input mode in response to the sensor module detecting the input object hovering a distance above the touchpad.

In one embodiment, the sensor module detects the input object in response to the input object contacting the touchpad. In another embodiment, the sensor module further determines a site of the input object in relation to the touchpad in response to detecting the input object contacting the touchpad. In a further embodiment, the display module presents the cursor within the display at a display location relative to a current display location of the cursor based on the determined site of the input object on the touchpad. In one embodiment, the apparatus includes a mode module that changes the input mode of the touchpad from an absolute input mode to a relative input mode in response to the sensor module detecting the input object contacting the touchpad.

In one embodiment, the display module presents an absolute cursor and a relative cursor within the display. In certain embodiments, the absolute cursor is presented in response to the sensor module detecting hover input while the touchpad is in the absolute input mode and the relative cursor is presented in response to the sensor module detecting touch input while the touchpad is in the relative input mode.

A method, in one embodiment, includes detecting, by a processor, an input object within a sensing range of a touchpad of an information handling device. In some embodiments, the information handling device includes a display such that the touchpad does not overlap the display. In some embodiments, the touchpad includes an absolute input mode and a relative input mode such that a location of a cursor within the display is controlled by input received by the touchpad while in one or more of the absolute input mode and the relative input mode.

In a further embodiment, the method includes presenting the cursor at a location within the display based on the input object. In some embodiments, the location of the cursor within the display is determined according to the input mode of the touchpad. In some embodiments, the information handling device includes a plurality of buttons operably coupled to the touchpad. In one embodiment, the plurality of buttons generate input events at the display location of the cursor while the touchpad is in a relative input mode.

In one embodiment, the information handling device comprises a clamshell information handling device. In another embodiment, the method includes detecting the input object in response to the input object hovering a distance above the touchpad. In some embodiments, the input mode of the touchpad is changed from a relative input mode to an absolute input mode in response to the sensing module detecting the input object hovering a distance above the touchpad.

In various embodiments, the method includes detecting the input object in response to the input object contacting the touchpad. In some embodiments, the input mode of the touchpad is changed from an absolute input mode to a relative input mode in response to the sensing module detecting the input object contacting the touchpad.

A computer program product, in one embodiment, includes a storage device storing machine readable code executed by a processor to perform operations. In one embodiment, the operations include detecting an input object within a sensing range of a touchpad of an information handling device. In some embodiments, the information handling device includes a display such that the touchpad does not overlap the display. In some embodiments, the touchpad includes an absolute input mode and a relative input mode such that a location of a cursor within the display is controlled by input received by the touchpad while in one or more of the absolute input mode and the relative input mode.

In a further embodiment, the operations include presenting the cursor at a location within the display based on the input object. In some embodiments, the location of the cursor within the display is determined according to the input mode of the touchpad.

References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of the embodiments as set forth hereinafter.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
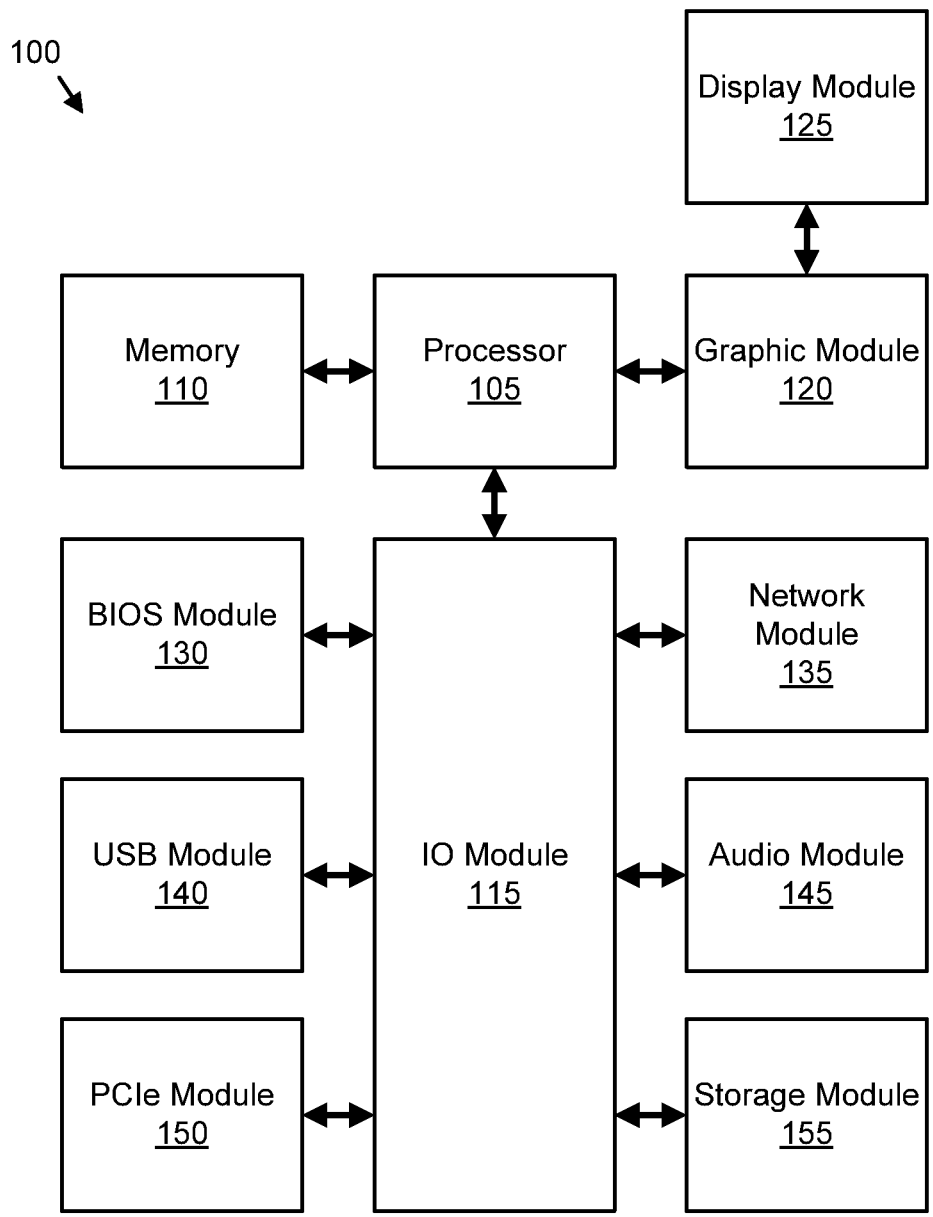
FIG. 1 is a schematic block diagram illustrating one embodiment of an information processing system.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more storage devices storing machine readable code. The storage devices may be tangible, non-transitory, and/or non-transmission.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in machine readable code and/or software for execution by various types of processors. An identified module of machine readable code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of machine readable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more storage devices.

Any combination of one or more machine readable medium may be utilized. The machine readable storage medium may be a machine readable signal medium or a storage device. The machine readable medium may be a storage device storing the machine readable code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A machine readable signal medium may include a propagated data signal with machine readable code embodied therein, for example, in baseband or as part of a carrier wave. Such a propagated signal may take any of a variety of forms, including, but not limited to, electro-magnetic, optical, or any suitable combination thereof. A machine readable signal medium may be any storage device that is not a computer readable storage medium and that can communicate, propagate, or transport a program for use by or in connection with an instruction execution system, apparatus, or device. Machine readable code embodied on a storage device may be transmitted using any appropriate medium, including but not limited to wireless, wireline, optical fiber cable, Radio Frequency (RF), etc., or any suitable combination of the foregoing.

Machine readable code for carrying out operations for embodiments may be written in any combination of one or more programming languages, including an object oriented programming language such as Java, Smalltalk, C++ or the like and conventional procedural programming languages, such as the "C" programming language or similar programming languages. The machine readable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by machine readable code. These machine readable code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The machine readable code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The machine readable code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and machine readable code.

Descriptions of Figures may refer to elements described in previous Figures, like numbers referring to like elements.

FIG. 1 is a schematic block diagram illustrating one embodiment of an information processing system 100. The information processing system 100 includes a processor 105, memory 110, an IO module 115, a graphics module 120, a display module 125, a basic input/output system ("BIOS") module 130, a network module 135, a universal serial bus ("USB") module 140, an audio module 145, a peripheral component interconnect express ("PCIe") module 150, and a storage module 155. One of skill in the art will recognize that other configurations of an information processing system 100 or multiple information processing systems 100 may be employed with the embodiments described herein.

The processor 105, memory 110, IO module 115, graphics module 120, display module 125, BIOS module 130, network module 135, USB module 140, audio module 145, PCIe module 150, and/or storage module 155 referred to herein as components, may, in some embodiments, be fabricated of semiconductor gates on one or more semiconductor substrates. Each semiconductor substrate may be packaged in one or more semiconductor devices mounted on circuit cards. Connections between the components may be through semiconductor metal layers, substrate-to-substrate wiring, circuit card traces, and/or wires connecting the semiconductor devices. In some embodiments, an information processing system may only include a subset of the components 105-160 shown in FIG. 1.

The memory 110 stores computer readable programs. The processor 105 executes the computer readable programs as is well known to those skilled in the art. The computer readable programs may be tangibly stored in the storage module 155 and may be loaded into memory 110 in preparation for processing. The storage module 155 may comprise at least one Solid State Device ("SSD"). Additionally or alternatively, the storage module 155 may include a hard disk drive, an optical storage device, a holographic storage device, a micromechanical storage device, remote network storage, or the like.

The processor 105 may include integrated cache to reduce the average time to access memory 110. The integrated cache may store copies of instructions and data from the most frequently used memory 110 locations. The processor 105 may communicate with the memory 110 and the graphic module 120.

In addition, the processor 105 may communicate with the IO module 115. The IO module 125 may support and communicate with the BIOS module 130, the network module 135, the USB module 140, the audio module 145, the PCIe module 150, the storage module 155, and/or other modules.

The PCIe module 150 may provide a communication bus that connects the I/O module to high speed subsystems such as wireless networks, memory card ports, or other devices or systems. The PCI module 150 may also comprise an expansion card as is well known to those skilled in the art. The USB module 140 may communicate with the IO module 115 for transferring/receiving data or powering peripheral devices. The USB module 140 may logically connect several peripheral devices over the same set of connections. The peripherals may be selected from a printer, a joystick, a touch input device, a mouse, a scanner, a camera, or the like.

The BIOS module 130 may communicate instructions through the IO module 115 to boot the information processing system 100, so that computer readable software instructions stored on the storage module 155 can load, execute, and assume control of the information processing system 100. Alternatively, the BIOS module 130 may comprise a coded program embedded on a chipset that recognizes and controls various devices that make up the information processing system 100.

The network module 135 may communicate with the IO module 115 to allow the information processing system 100 to communicate with other devices over a network. The devices may include routers, bridges, computers, information processing systems, printers, and the like. The display module 125 may communicate with the graphic module 120 to display information. The display module 125 may include any type of display screen such as a liquid crystal display ("LCD") screen, projector, or the like. The USB module 140 may communicate with one or more USB compatible devices over a USB bus. Exemplary USB compatible devices include storage devices, input devices, cameras, or the like. Input devices may include touch-input devices such as touch pads, track pads, touch-screens, or the like. The audio module 145 may generate an audio output.

Figure 2:
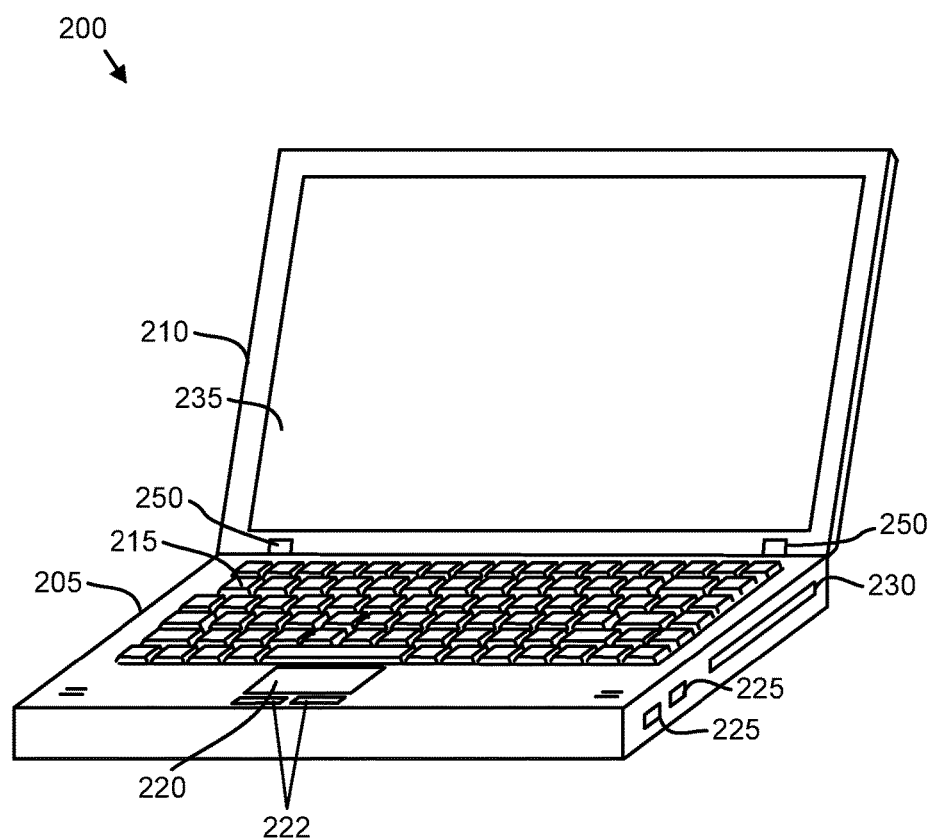
FIG. 2 is a perspective front view illustrating one embodiment of a computer having a clamshell form factor.

FIG. 2 depicts one embodiment of computer 200 in accordance with the present subject matter. In one embodiment, the computer 202 is one embodiment of an information processing system 100. The computer 202 is depicted having a clamshell form factor but one skilled in the art will recognize in light of the present disclosure that a computer 202 may include any form factor known in the art. Exemplary alternate form factors may include form factors recognized and used in relation to tablet computers, phones, desktops, or any other information processing device.

As shown in the figure, the computer 200 may include a keyboard-side casing 205 and a display-side casing 210. The keyboard-side casing 205 may be provided with exemplary input devices such as the depicted keyboard 215, touchpad 220, and/or any other input devices. The keyboard-side casing 205 may also be provided with one or more I/O ports 225 and/or an optical drive 230. In some embodiments, the keyboard-side casing 205 may be replaced with a casing that lacks a keyboard. For example, an alternate casing to a keyboard-side casing may include a display in place of the keyboard or may include different key layouts or alternate forms of input other than the keyboard.

The display-side casing 210 may be provided with a display screen 235. The display screen 235 may be a touch-input screen that responds to touch input from an input device. Exemplary input devices may include a finger, a stylus, a pen, or other types of input devices. The display-side casing 210 may also be provided with a variety of other components including speakers, microphones, cameras, ports, or any other component.

In one embodiment, the display-side casing 210 may be a stand-alone information processing system 100. For example, the display-side casing may include a tablet computer that is mountable on the keyboard-side casing 205. For example, the display-side casing 210 may dock on the keyboard-side casing 205 for use similar to a laptop computer or other clamshell device. When docked on the keyboard-side casing 205 the input devices, ports, and components of the keyboard-side casing 205 may be functional in relation to a tablet computer of the display-side casing 210. For example, when docked, the keyboard 215 may be used to enter text into a tablet computer and/or a touchpad 220 may be used to provide input. The tablet computer may be an information processing system 100 that is running an operating system optimized for a tablet computer. For example, the tablet computer may be optimized for input on a touch-screen and/or the operating system may be a touch-optimized operating system.

In some embodiments, the touchpad 220 does not overlap the display 235 of the computer. The touchpad 220, in another embodiment includes at least two different modes of input: an absolute input mode, and a relative input mode. As used herein, an absolute input mode may be an input mode where the detected location of an input object on or near the touchpad 220 maps 1:1 to a location on the display 235. For example, a cursor presented on the display 235 may be positioned at a location on the display 235 that corresponds to the location on the touchpad 220 where an input object is detected. Relative mode, on the other hand, may be an input mode where the position of the cursor presented on the display 235 is dependent on a current location of the cursor and the detected location of an input object on or near the touchpad 220. For example, instead of a display location for a cursor corresponding 1:1 to a location on the touchpad 220, the display location for the cursor is determined relative to the current position of the cursor on the display 235. So, in relative mode, an input object may be placed anywhere on or near the touchpad 220, and as the object is moved on or near the touchpad 220, the cursor moves relative to a previous location. In absolute mode, the cursor is placed at a location on the display 235 that corresponds to the detected location on or near the touchpad 220 of the input object, and is not based on a previous or current location of the cursor.

In one embodiment, the touchpad 220 includes one or more buttons 222 operably coupled to the touchpad 220. In certain embodiments, the one or more buttons generate input events at the display location of the cursor while the touchpad 220 is in a relative input mode. For example, the touchpad 220 may include a left button that triggers a left-click event and a right button that triggers a right-click event when the touchpad 220 is in a relative input mode. In some embodiments, the one or more buttons 222 may be integrated into the touchpad 220 (e.g., a click touchpad 220) such that a user presses down on the touchpad 220 to actuate a button 222. For example, the left-click button may be located in the bottom left corner area of the touchpad 220 and the right-click button may be located in the bottom right corner area of the touchpad 220 such that a user can press on the bottom left corner of the touchpad to trigger a left click and on the bottom right corner of the touchpad to trigger a right click. Moreover, in some embodiments, the buttons 222 may be virtual buttons that are actuated with a touch gesture, such as a one-finger touch to trigger a left-click and a two-finger touch to trigger a right-click.

In the depicted embodiment, the keyboard-side casing 205 and the display-side casing 210 are connected by a pair of left and right connecting members (hinge members) 250, which support the casings in a freely openable and closable manner. The connecting members 250 may allow for adjusting the angle of the display-side casing 210 with respect to the keyboard side casing 205. In one embodiment, only a single connecting member 250 may be included. For example, a single hinge or other connecting device may be used. Some embodiments may include mounts that allow for the display-side casing 210 to be selectively mounted to or removed from the keyboard-side casing 205.

The depicted computer 200 is only one embodiment of an information processing system 100 which may be used in accordance with the present subject matter. Other types of information processing systems 100 or computers 200 may include, but are not limited to, a phone, a tablet computer, a pad computer, a personal digital assistant (PDA), and a desktop computer.

Figure 3A:
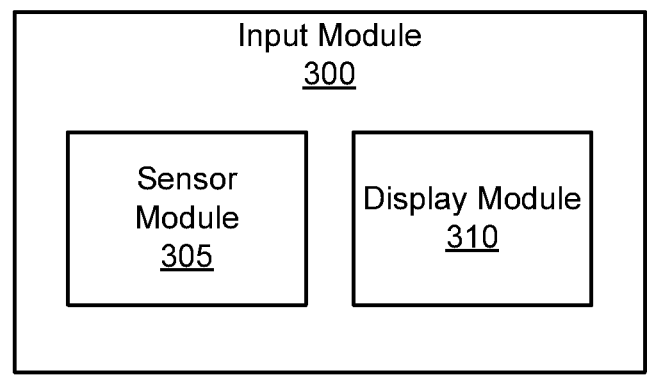
FIGS. 3A and 3B are a schematic block diagrams illustrating exemplary embodiments of input modules.

FIG. 3A is a schematic block diagram illustrating one embodiment of an input module 300. The input module 300 may be used to interpret input provided by an input device as input to a computer 200 or information processing system 100. In one embodiment, the input module 300 may be used to interpret input from an input device other than a touch-screen input device for use with a touch-optimized interface. For example, if an input device other than a touch-screen is used to provide input to a computer 200 running a touch-optimized operating system the input module 300 may interpret the input to optimize use of the device with the touch-optimized operating system.

As used herein the term touch-optimized is given to mean that a device, program, or interface is optimized for receiving input from a touch-screen input device. As used herein the term touch-screen is given to mean a device that operates both as a display screen and a device for receiving input via contact with an input object. In one embodiment, input to a touch-screen at a first location corresponds to a display location at substantially the same location as the first location.

Depending on the embodiment, the input module 300 may be embodied in the form of software or hardware. For example, software code may be stored by the storage module 155 or within memory 110. Alternatively, circuitry implementing the functionality of the input module 300 may be included in a computer 200 or information processing system 100. In one embodiment, a portion of the input module 300 may be included as circuitry within the hardware or software of an input device.

The sensor module 305 may determine a site of an input object in relation to a touch-sensitive input surface or camera. The sensor module 305 may detect the input object that is within a sensing range of the touch-sensitive input surface. The touch-sensitive input surface may include any type of touch device known in the art. Exemplary touch devices may include a capacitive, resistive or optical touchpad, trackpad, drawing tablet, or the like. In one embodiment, a one or more cameras may be used to sense input on a surface.

In one embodiment, the sensor module 305 detects an input object in response to the input object contacting or touching the touchpad 220. For example, the sensor module 305 may detect a user touching the touchpad 220 with a finger or a stylus. In some embodiments, the sensor module 305 detects an input object touching the touchpad 220 when the touchpad 220 is in a relative input mode. In response to detecting the input object touching the touchpad 220, the sensor module 305 may determine a site of the input object on the touchpad 220. Based on the determined site on the touchpad 220, the display module 310, described below, may position or display a cursor at a display location relative to the current position or location of the cursor on the display 235.

In one embodiment, the sensor module 305 detects an input object in response to the input object hovering a distance above the touchpad 220. For example, the sensor module 305 may detect when a stylus or a finger is within a sensing distance (e.g., 1 cm, 2 cm, 3 cm, etc.) of the touchpad 220 without touching or making contact with the touchpad 220. In some embodiments, the sensor module 305 detects an input object hovering above the touchpad 220 when the touchpad 220 is in an absolute input mode. In response to detecting the input object hovering above the touchpad 220, the sensor module 305 may determine a site of the input object in relation to the touchpad 220. In certain embodiments, the site of the input object corresponds to an input detectable location on the touchpad 220.

In various embodiments, the touchpad 220 includes a plurality of input detectable locations that map directly or 1:1 to a plurality of corresponding display locations on the display 235. When the touchpad 220 is in an absolute input mode, for example, the sensor module 305 may detect an input object hovering above the touchpad 220 and may determine a site on the touchpad 220 corresponding to the detected location of the input object. Based on the determined site on the touchpad 220, the display module 310, described below, may position or display a cursor at a display location that corresponds 1:1 to the site on the touchpad 220 determined by the sensor module 305.

Figure 4:
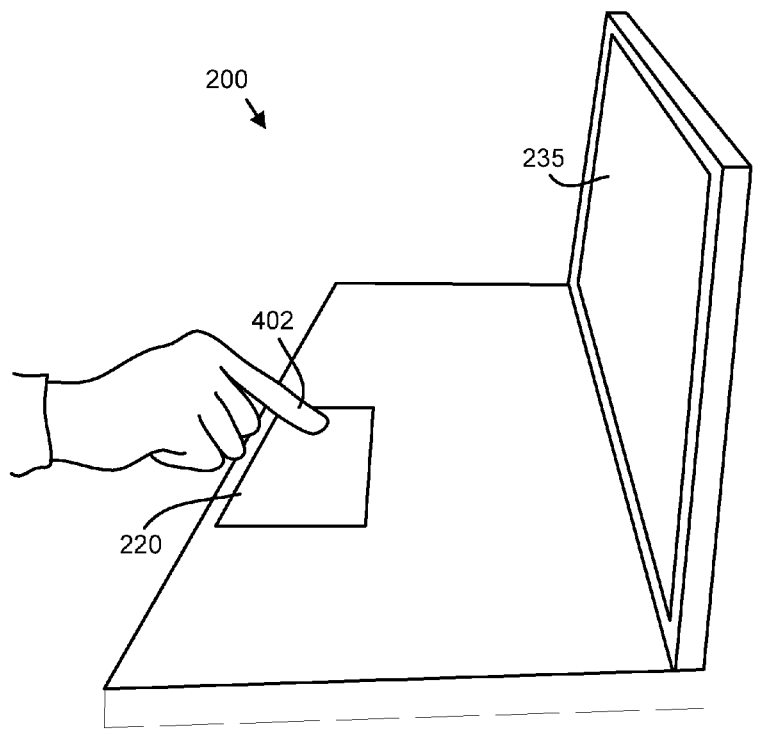
FIG. 4 is a perspective side view illustrating one embodiment of a computer with a touchpad in use.

The sensor module 305 may receive a signal from hardware of an input device and may determine a location of the input object based on the signal. For example, the sensor module 305 may receive a signal from a capacitive touchpad, a camera, or the like and determine a location of an input object. FIG. 4 illustrates on embodiment of a computer 200 having a display screen 235 and a touchpad 220. According to one embodiment, a finger 402 placed on or near the touchpad 202 generates a signal which can be received by the sensor module 305. The sensor module 305 may receive this signal and then determine the site of the finger 402 in relation the surface of the touchpad.

In one embodiment, the sensor module 305 may determine a site of an input object that includes a lateral location of the input object. In one embodiment, the lateral location corresponds to the location of the input object with respect to a plain substantially parallel to the surface of the input object. Turning to FIG. 4, an input object (the finger 402) is shown above the touchpad 220. According to one embodiment, the lateral location of the finger may not change depending on the amount of pressure between the finger 402 and the touchpad 220 and/or the amount of distance between the finger 402 and the touchpad 220. Thus, the lateral location may be strictly dependent on a two dimensional location of the finger 402 within a plane above or on the touchpad 220.

The lateral location of the finger 402 over the touchpad 220 may be calculated by the sensor module 305 which may return a value or other information indicating the lateral location. The information returned by the sensor module 305 may include information describing the location of the finger 402 or other input object within two dimensions. For example, an x-coordinate and y-coordinate may be returned to indicate the offset of the finger 402 from a corner of the touchpad 220.

In one embodiment, the sensor module 305 may determine a site of an input object that includes a perpendicular state of the input object. The sensor module 305 may determine that an input object is within one of a plurality of possible states. In one embodiment, with respect to the embodiment of FIG. 4, the sensor module 305 may determine whether a finger 402 within a sensing range of the touchpad 202 is in a cursor display state or an event generator state. For example, possible perpendicular states for the finger may be a cursor display state, an event generator state, and may even include additional possible states.

In one embodiment, the perpendicular state of an input object is based on an amount of force between the input object and a touch-sensitive input surface. For example, if the sensor module 305 determines that the amount of force between an input object and a touch-sensitive surface is less than a threshold value, the sensor module 305 may determine that the input object is in a cursor display state. If the sensor module 305 determines that the amount of force between an input object and a touch-sensitive surface exceeds or meets the threshold value, the sensor module 305 may determine that the input object is in an event generator state. For example, the harder the finger 402 of FIG. 4 is pressed against the touchpad 220 the greater the amount of force the sensor module 305 may measure. A user may thus control the state of the finger (input object) 402 by increasing or decreasing the amount of pressure applied to the touchpad 220. According to one embodiment, the amount of force between a finger 402 and a touchpad 220 may be approximated based on the amount of capacitance, or resistance measured by the touchpad 220. In another embodiment, the touchpad 202 may include a pressure sensitive switch that is closed or opened in response to a threshold amount of pressure.

Figure 6:
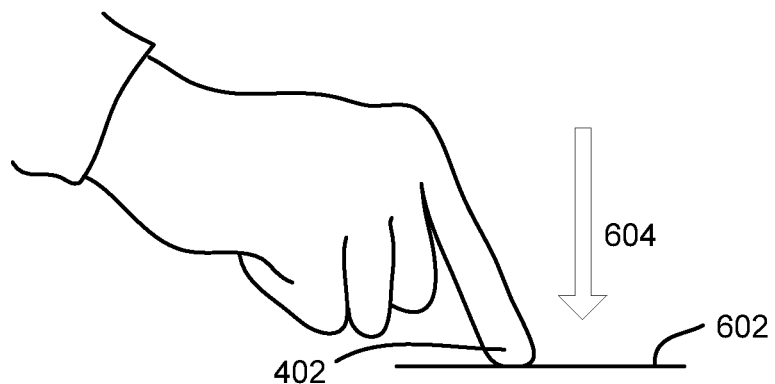
FIG. 6 is a side view of a finger being used for input on a touch-sensitive input surface according to one embodiment.

FIG. 6 illustrates how a perpendicular state may be based on an amount of force between a finger 402 and a touch-sensitive surface 602. A user's finger 402 is shown in contact with a touch-sensitive surface 602. The touch-sensitive surface 602 may include a surface of a touchpad, trackpad, or any other device that is sensitive to contact with an input device. A user may press a finger 402 in the direction indicated by arrow 604 increase the amount of pressure between the finger 402 and the touch-sensitive surface 602 and thereby place the finger 402 (input object) in a cursor display state that can be measured by a sensor module 305.

Similarly, the user may reduce the amount of pressure by reducing the force in the direction of arrow 604 and thereby place the finger 402 (input object) in an event generator state. According to one embodiment, the finger 402 must be touching or be very close to the touchpad to be registered as in either the cursor display state or the event generator state.

In one embodiment, the perpendicular state of an input object is based on a distance between the input object and the touch-sensitive input surface. For example, if the sensor module 305 determines that the distance between an input object and a touch-sensitive surface is greater than a threshold value, the sensor module 305 may determine that the input object is in a cursor display state. If the sensor module 305 determines that the distance between an input object hovering above a touch-sensitive surface and a touch-sensitive surface is the same or less than the threshold value, the sensor module 305 may determine that the input object is in an event generator state. For example, the sensor module 305 may be able to detect how close the finger 402 of FIG. 4 is hovering to the touchpad 220.

A user may thus control the state of the finger (input object) 402 by moving the finger 402 closer to or farther from the touchpad 220. In one embodiment, the sensor module 305 may determine that a finger 402 is in a cursor display state when it is in a non-contact sensing range of the touchpad 220. In one embodiment, the sensor module 305 may determine that the finger 402 is in an event generator state when it is in contact with the touchpad 220. According to one embodiment, whether a finger 402 contacts a touchpad 220 may be approximated by the sensor module 305 based on the amount of capacitance or resistance measured by the touchpad 220.

Figure 7:
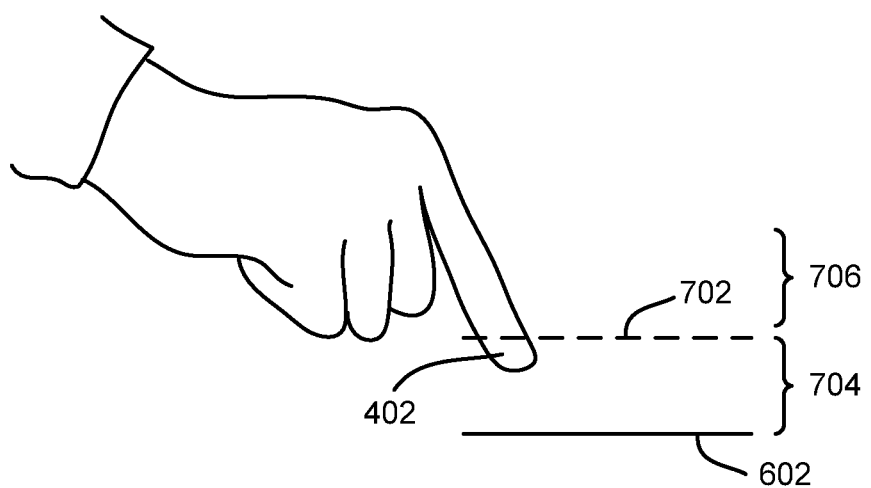
FIG. 7 is a side view of a finger being used for input on a touch-sensitive input surface according to another embodiment.

FIG. 7 illustrates how a perpendicular state may be based on a distance between a finger 402 and a touch-sensitive surface 602. A user's finger 402 is shown above a surface of a touch-sensitive surface 603. Line 702 indicates the maximum distance in which the touchpad or a sensor module 305 may detect the location of the finger 402. For example, capacitive touch-sensitive surfaces may be able to sense a finger that is close but not in contact with the capacitive touch-sensitive surface. Thus, the area between the line 702 and the touch-sensitive input surface 602 is one embodiment of a non-contact sensing range 704. The range 706 above the line 702 indicates a range where the touchpad and/or associated sensor module 305 may not be able to determine a site of the finger 402.

In one embodiment, a user may move the user's finger 402 upwards or downwards such that the finger is above the non-contact sensing range 704, within the non-contact sensing range 704, or in contact with the touch-sensitive surface 602. According to one embodiment, the user may be able to place the user's finger 402 in a cursor display state by placing the finger 402 within the non-contact sensing range 704 but not in contact with the touch-sensitive surface 602. In one embodiment, the user may be able place the finger 402 in an event generator state by touching the touch-sensitive surface 602. According to one embodiment, the finger 402 must be touching or be very close to the touchpad to be registered as in the event generator state.

In one embodiment, the sensor module 305 may be configured to determine a site of only one input object. In one embodiment, sensor module 305 may be configured to determine a site of more than one input object. For example, the sensor module 305 may allow for multiple fingers to be used for input on a touchpad 220 or other input surface at substantially the same time.

Returning to FIG. 3A the display module 310 may display a cursor on a display screen or other display device. According to one embodiment, the display module 310 may display the cursor within a touch-optimized graphical user interface (GUI). For example, the cursor may be displayed within an interface that is optimized for use with a touch-screen. The interface may be the interface of a specific application, subroutine, or even an operating system. For example, operating systems, applications, and operations on a tablet computer or touch-screen phone may be optimized for allowing input using a finger on a touch-screen. For example, many or most icons, buttons, or other selectable items may have sizes enabling easy selection with a tip of a finger 204. Navigation may be based largely on finger swipes or other forms of common touch gestures or input. In one embodiment, icons, buttons, or other selectable items are generally approximately the size of the tip of a finger expected on the touch-screen. Exemplary touch-optimized operating systems currently known in the art include Apple's® iOS®, Microsoft's® Windows Phone 7®, Microsoft's® Windows 8®, Google's® Android® operating systems, and the like.

The display module 310 may display the cursor on the display screen at a display location corresponding to a site of an input object. According to one embodiment, the display module 310 receives information from the sensor module 305 regarding the site of the input object. The display module 310 may determine a display location that corresponds to site of the input object. For example, the display module 310 may map the site of the input object to a location on a display screen. In one embodiment, the display module 310 receives only a lateral location of the input object and determines display location that corresponds to the lateral location.

In some embodiments, the display module 310 presents the cursor at a location within the display 235 based on the input object and the input mode of the touchpad 220. For example, as described above, if the touchpad 220 is in an absolute input mode, the display module 310 may display the cursor at a location on the display 235 that directly corresponds to the detected location of the input object on or near the touchpad 220. If the touchpad 220 is in a relative mode, on the other hand, the display module 310 may display the cursor at a location relative to a current location of the cursor according to the detected location of the input object on or near the touchpad 220.

For example, in one embodiment, if the touchpad 220 is in an absolute input mode, the sensor module 305 may detect an input object hovering above the touchpad 220 and determine a site on the touchpad 220 that corresponds to the detected location of the input object. In such an embodiment, the display module 310 may determine a site or location on the display 235 that corresponds 1:1 with the determined site of the input object on the touchpad 220 and position or present the cursor at that display location.

In another example, if the touchpad 220 is in a relative input mode, the sensor module 305 may detect an input object touching the touchpad 220 and determine a site on the touchpad 220 that corresponds to the detected location of the input object. In such an embodiment, the display module 310 may determine a site or location on the display relative to the current position of the cursor, based on the location of the detected input object, and position or present the cursor at that display location.

In certain embodiments, the display module 310 presents both an absolute cursor and a relative cursor on the display 235. The absolute cursor, for example, may be controlled by hover input received on the touchpad 220 by the sensor module 305, and the relative cursor may be controlled by touch input received on the touchpad 220 by the sensor module 305. Thus, in such an embodiment, the touchpad 220 may be simultaneously in both a relative input mode and an absolute input mode such that detected touch input controls a cursor in relative input mode and detected hover input controls a cursor in absolute input mode.

According to one embodiment, the sensor module 305 and display module 310 may frequently refresh a determined site of an input module and a corresponding display location on a screen. This may allow an individual to move a finger over a touch-sensitive input surface and see a corresponding movement of a cursor on the screen.

In one embodiment, each detectable lateral location of a touch-sensitive input surface may be mapped to a corresponding display location on a display screen. For example, if a sensor module 305 determines that an input object is at a lateral location halfway between a top and bottom of a touch-sensitive input surface the display module 310 may display a cursor at a location halfway between a top and bottom of a display screen. Similar mapping may be done in a horizontal direction. In some embodiments a display screen will be larger than touch-sensitive input surface and a small movement of a finger 402 or other input object with regard to a touch-sensitive input surface may result in the display module 310 displaying a larger movement of a cursor on a display screen. In one embodiment, a touch-sensitive input surface and a display screen may have the same aspect ratio while in other embodiments the aspect ratio may differ. One of skill in the art will understand in light of the present disclosure significant variation and adaptation for mapping a site of an input object determined by a sensor module 305 to a display location on a display screen.

The cursor displayed by the display module 310 may have a variety of different sizes and appearances. In one embodiment, the display module 310 displays a cursor having a substantially round shape. In one embodiment, the cursor is substantially round and approximates the shape of a tip of a finger. In one embodiment, the size of the cursor approximates the size of a finger expected by the touch-optimized graphical user interface (GUI). For example, a tip of a finger may be much larger compared to a touchpad or other type of touch-sensitive input surface and it may be desirable to show a cursor on the display screen that approximates the size of a finger in relation to the display screen.

In one embodiment, the display module 310 may display a cursor that is at least semi-transparent. For example, if the cursor is a round shape about the size of a finger, it may cover certain portions of an interface. A semi-transparent cursor may allow a user to see what is "behind" the cursor and more accurately select what is desired. The cursor may also include a pin-point indicator. The pin-point indicator may show the exact location at which the interface will interpret as the location of the cursor. For example, any selections, touch inputs, or any other events generated based on the cursor may be interpreted as occurring at the location of the pin-point indicator. The pin-point indicator may include a dot, arrow, cross hairs, or any other indicator for accurately indicating an area or pixel on a display screen.

In one embodiment, the display module 310 may display a plurality of cursors. For example, if the sensor module 305 senses and/or determines the site of more than one input object, the display module 310 may display a cursor at a display location corresponding to the site of each input object. According to one embodiment, this may allow a user to perform complex input and/or gestures.

Figure 5:
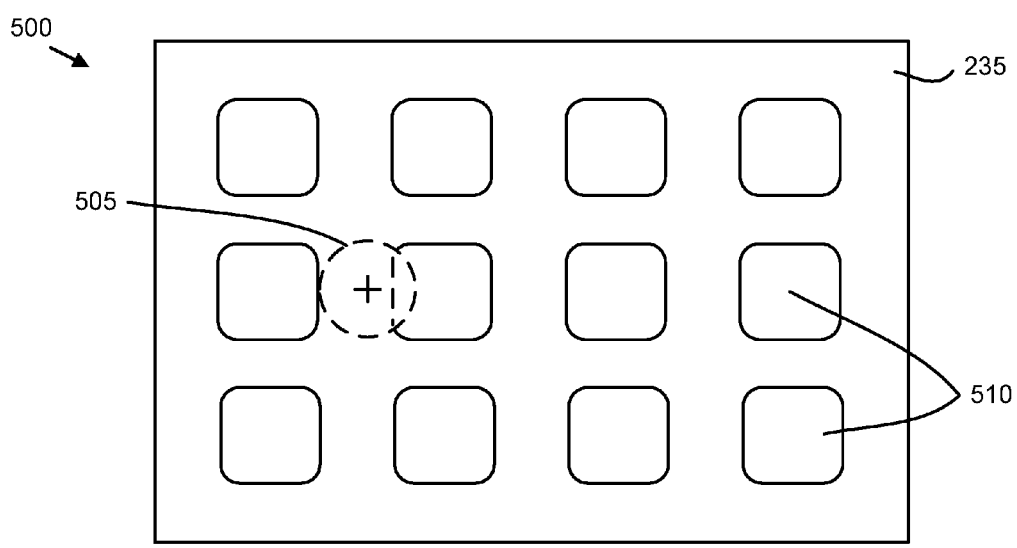
FIG. 5 is an exemplary screen shot illustrating display of a cursor in a touch-optimized interface.

FIG. 5 is a screen shot 500 illustrating the display of a cursor 505 within a touch-optimized interface. According to one embodiment, the display location of the cursor 505 on the display 235 corresponds to the site of the finger 402 as illustrated in FIG. 4. The cursor 505 is shown with a circular shape and is transparent such that objects or content within the interface may be seen behind the cursor 505. The cursor 505 is also shown with a pin-point indicator that includes cross-hairs.

Figure 8:
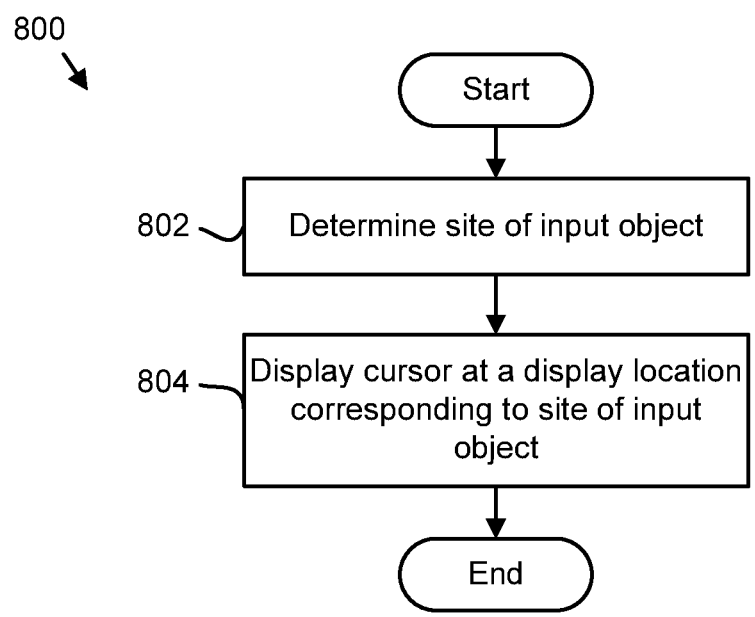
FIG. 8 is a schematic flow chart diagram illustrating one embodiment of a method for displaying a cursor.

Also shown on the display 235 is a plurality of objects 510. The objects 510 may be icons or buttons for selecting programs, options, or initiating other software processes. According to one embodiment, the objects are substantially the size of a finger expected by the displayed interface. Note that the cursor is approximately the same size as the objects 510. According to one embodiment, a user may move the user's finger 402 in relation to the touchpad 202 (as shown in FIG. 4) and be able to visually see the cursor 404 move on the display screen 235 and relative to the objects 510 to reflect the finger's 402 position. The user may be able to move the finger 402 until the cursor 505 is in a desired location and then initiate an action at that location. For example, the user may place the finger 402 in a different state, such as change it from a cursor display state to an event generation state, to trigger an event at the location of the cursor. Exemplary triggering of events will be discussed further in relation to the event generator module 315 of FIG. 3B Turning to FIG. 8, a schematic flow chart diagram illustrating a method 800 for displaying a cursor is shown. The method 800 may be performed by an input module 300 and/or within an information processing system 100 or computer 200. The method 800 may be used, in one embodiment, to display a cursor within a touch-optimized interface when input other than a touch-screen is used. In one embodiment, the method 800 may be used in relation to a touchpad, track pad, or graphics pad.

The method 800 begins and a sensor module 305 determines 802 a site of an input object. The sensor module 305 may determine 802 the site of the input object based on a signal received from a touch-sensitive input device such as a touchpad, trackpad, or the like. In one embodiment, the site determined 802 by sensor module 305 may include a lateral location and a perpendicular state of the input object.

A display module 310 may display 804 a cursor at a display location corresponding to the site of the input object. In one embodiment, the display location may correspond to the lateral location determined by the sensor module 305. The cursor may be displayed 804 within a touch-optimized graphical user interface. In one embodiment, the cursor may be approximately the size of a finger expected within the touch-optimized graphical user interface and/or may include a pin-point indicator to indicate a precise location of where an event may be triggered.

Figure 3B:
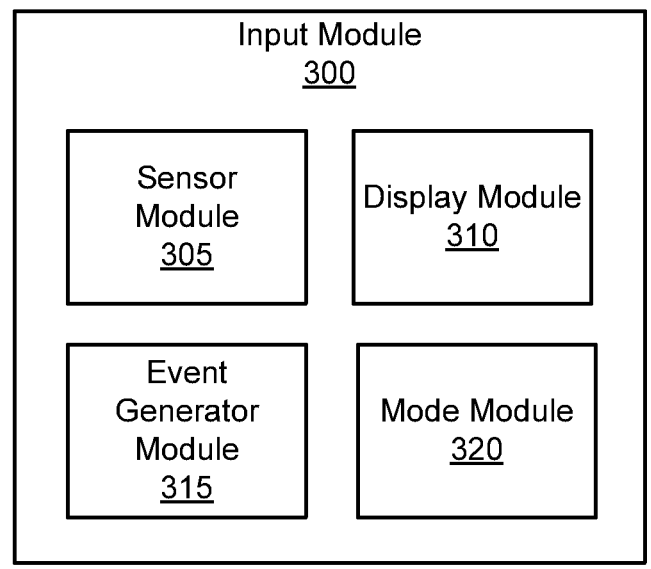

FIG. 3B is a schematic block diagram illustrating another embodiment of an input module 300. The input module 300 includes a sensor module 305 and a display module 310 which may include any of the variation or functionality discussed herein. The input module 300 also includes an event generator module 315 and a mode module 320.

The event generator module 315 may generate an event at the location of a cursor. In one embodiment, the event generator module 315 generates an event in response to the sensor module 305 determining that an input object is in an event generator state. In one embodiment, the event generated by the event generator module 315 is a touch input event. For example, the event generated at the display location may be the same as if a touch-screen were touched by a finger at the display location. The interface, application, or operating system may respond to the input object being in an event generator state just as if touch input were provided at the location of the cursor.

In one embodiment, the mode module 320 is configured to change the input mode of the touchpad 220 from a relative input mode to an absolute input mode in response to the sensor module 305 detecting an input object is hovering a distance above the touchpad 220. In another embodiment, the mode module 320 is configured to change the input mode of the touchpad 220 from an absolute input mode to a relative input mode in response to the sensor module 305 detecting the input object contacting or touching the touchpad 220.

For example, if the sensor module 305 detects an input object hovering above the touchpad 220 while the touchpad 220 is in a relative input mode, the mode module 320 may switch the input mode of the touchpad 220 from a relative input mode to an absolute input mode. Similarly, if the sensor module 305 detects an input object touching the touchpad 220 while the touchpad 220 is in an absolute input mode, the mode module 320 may switch the input mode of the touchpad 220 from an absolute input mode to a relative input mode.

According to one embodiment, the modules 305-320 of the input module 300 may allow for natural and convenient use of a touch-optimized interface without a touch-screen. For example, a user may be able to hover a finger over a touchpad and see a location of a cursor on a display. When the cursor is in a desired location, such as over an object for selection, the user may place his finger in an event generator state by touching the touchpad 220 or hovering a finger within a predetermined event generator distance of the touchpad 220 and trigger an event corresponding to a touch-input event on that object. The user may be able to trigger a select event, a drag event, or any other event or action. For example, a user may be able to tap the touchpad, touch and release contact, to initiate a select event that corresponds to a tap on the screen at a corresponding location. As another example, a user may be able to touch the touchpad and drag a finger across the touchpad to generate a drag event to drag an object across a corresponding location of a screen. Other actions or events are similarly possible and may correspond to actions or events that may be generated using a touch screen. The user may be able to easily and quickly navigate the touch-optimized interface in more natural and convenient manner than may be possible using a conventionally operable mouse cursor.

Figure 9:
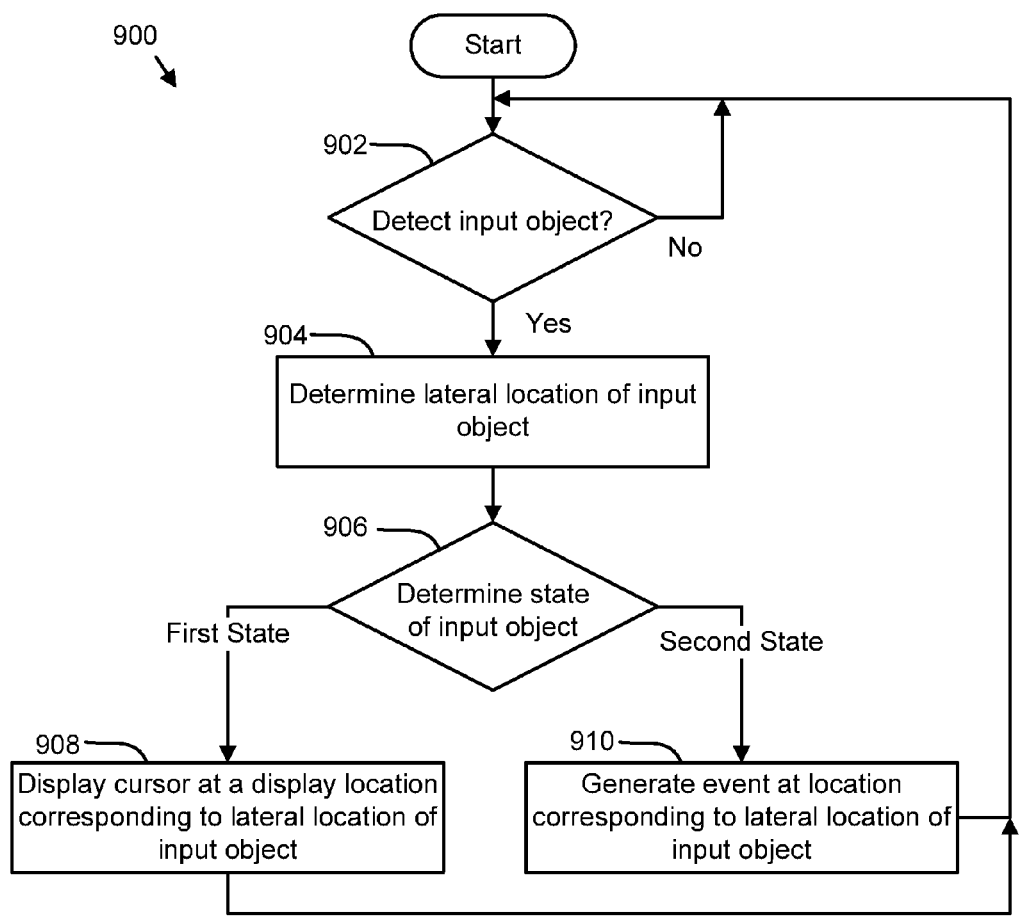
FIG. 9 is a schematic flow chart diagram illustrating one embodiment of an input processing method.

FIG. 9 is a schematic flow chart diagram illustrating one embodiment of an input processing method 900. In one embodiment, the method 900 is performed by an input module 300 as described herein.

The method 900 begins and a sensor module 305 attempts to detect 902 an input object. If an input object is not detected 902 the sensor module 305 may continue to attempt to detect 902 an input object. If an input object is detected 902 the sensor module 305 may then determine 904 a lateral location of the input object. In one embodiment, the sensor module 305 may receive a signal from an input device such as a touchpad, trackpad, or other device having a touch-sensitive input surface. The sensor module 305 may determine 904 the lateral location of the input object based on the received signal.

The sensor module 305 may also determine 906 a state of the input object. If the input object is determined 906 to be in a cursor display state the display module 310 may display a cursor on a display screen. In one embodiment, the cursor is displayed at a display location on a display screen that corresponds to the lateral location determined 904 by the sensor module 305. If the input object is determined 906 to be in an event generator state the event generator module 315 generates 910 an event at a location corresponding to the lateral location determined 904 by the sensor module 305. In one embodiment, the even generator module 315 generates 910 a touch-input event at the location of the cursor. For example, an event generated by the event generator module 315 may be the same or similar to an event generated by an operating system or other program in response to a touch at the same location on a touch-screen.

In one embodiment, the method 900 may loop to repeatedly to provide updated display of a cursor in response to movement of an input device and/or generate an event or continue an event (such as a dragging event) in response to the input object being in an event generator state.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a display;
   a touchpad that does not overlap the display, the touchpad comprising an absolute input mode and a relative input mode, wherein a location of a cursor within the display is controlled by input received by the touchpad while in one or more of the absolute input mode and the relative input mode;
   a storage device storing machine-readable code; and
   a processor executing the machine-readable code, the machine-readable code comprising:
      a sensor module that detects an input object within a sensing range of the touchpad, the sensor module determining a perpendicular state of the input object based on a distance between the input object and the touchpad, wherein:
         the perpendicular state comprises a cursor display state in response to the distance between the input object and the touchpad being greater than a threshold value; and
         the perpendicular state comprises an event generator state in response to the distance between the input object and the touchpad being less than or equal to the threshold value;
      a mode module that, in response to the perpendicular state comprising a cursor display state:
         changes the input mode of the touchpad from a relative input mode to an absolute input mode in response to determining that the input object is hovering a distance above the touchpad: and
         changes the input mode of the touchpad from an absolute input mode to a relative input mode in response to the sensor module detecting the input object contacting the touchpad;
      a display module that, in response to the perpendicular state comprising a cursor display state, presents the cursor at a location within the display based on the input object, the location of the cursor within the display being determined according to the input mode of the touchpad; and an event generator module that, in response to the perpendicular state comprising an event generator state, generates an input event at the location of the cursor within the display.

2. The apparatus of claim 1, further comprising a plurality of buttons operably coupled to the touchpad, the plurality of buttons generating input events at the display location of the cursor while the touchpad is in a relative input mode.

3. The apparatus of claim 1, wherein the display and the touchpad are part of a clamshell information handling device.

4. The apparatus of claim 1, wherein the sensor module detects the input object in response to the input object hovering a distance above the touchpad.

5. The apparatus of claim 4, wherein the sensor module further determines a site of the input object in relation to the touchpad in response to detecting the input object hovering a distance above the touchpad.

6. The apparatus of claim 5, wherein the determined site of the input object corresponds to an input detectable location on the touchpad, the touchpad comprising a plurality of input detectable locations that map 1:1 to a plurality of corresponding display locations of the display.

7. The apparatus of claim 6, wherein the display module presents the cursor at a display location that corresponds to the input detectable location associated with the determined site in response to the touchpad being in an absolute input mode.

8. The apparatus of claim 1, wherein the sensor module detects the input object in response to the input object contacting the touchpad.

9. The apparatus of claim 8, wherein the sensor module further determines a site of the input object in relation to the touchpad in response to detecting the input object contacting the touchpad.

10. The apparatus of claim 9, wherein the display module presents the cursor within the display at a display location relative to a current display location of the cursor based on the determined site of the input object on the touchpad.

11. The apparatus of claim 1, wherein the display module presents an absolute cursor and a relative cursor within the display, the absolute cursor being presented in response to the sensor module detecting hover input while the touchpad is in the absolute input mode and the relative cursor being presented in response to the sensor module detecting touch input while the touchpad is in the relative input mode.

12. A method comprising:
detecting, by a processor, an input object within a sensing range of a touchpad of an information handling device, the information handling device comprising a display such that the touchpad does not overlap the display, the touchpad comprising an absolute input mode and a relative input mode, wherein a location of a cursor within the display is controlled by input received by the touchpad while in one or more of the absolute input mode and the relative input mode;
determining a perpendicular state of the input object based on a distance between the input object and the touchpad, wherein:
the perpendicular state comprises a cursor display state in response to the distance between the input object and the touchpad being greater than a threshold value; and
the perpendicular state comprises an event generator state in response to the distance between the input object and the touchpad being less than or equal to the threshold value;
changing, in response to the perpendicular state comprising a cursor display state, the input mode of the touchpad from a relative input mode to an absolute input mode in response to determining that the input object is hovering a distance above the touchpad;
changing, in response to the perpendicular state comprising a cursor display state, the input mode of the touchpad from an absolute input mode to a relative input mode in response to the sensor module detecting the input object contacting the touchpad;
presenting, in response to the perpendicular state comprising a cursor display state, the cursor at a location within the display based on the input object, the location of the cursor within the display being determined according to the input mode of the touchpad; and
generating, in response to the perpendicular state comprising an event generator state, an input event at the location of the cursor within the display.

13. The method of claim 12, wherein the information handling device comprises a plurality of buttons operably coupled to the touchpad, the plurality of buttons generating input events at the display location of the cursor while the touchpad is in a relative input mode.

14. The method of claim 12, wherein the information handling device comprises a clamshell information handling device.

15. A program product comprising a non-transitory computer readable storage medium that stores code executable by a processor, the executable code comprising code to perform:
detecting an input object within a sensing range of a touchpad of an information handling device, the information handling device comprising a display such that the touchpad does not overlap the display, the touchpad comprising an absolute input mode and a relative input mode, wherein a location of a cursor within the display is controlled by input received by the touchpad while in one or more of the absolute input mode and the relative input mode;
determining a perpendicular state of the input object based on a distance between the input object and the touchpad, wherein:
the perpendicular state comprises a cursor display state in response to the distance between the input object and the touchpad being greater than a threshold value; and
the perpendicular state comprises an event generator state in response to the distance between the input object and the touchpad being less than or equal to the threshold value;
changing, in response to the perpendicular state comprising a cursor display state, the input mode of the touchpad from a relative input mode to an absolute input mode in response to determining that the input object is hovering a distance above the touchpad;
changing, in response to the perpendicular state comprising a cursor display state, the input mode of the touchpad from an absolute input mode to a relative input mode in response to the sensor module detecting the input object contacting the touchpad; and
presenting, in response to the perpendicular state comprising a cursor display state, the cursor at a location within the display based on the input object, the location of the cursor within the display being determined according to the input mode of the touchpad; and generating, in response to the perpendicular state comprising an event generator state, an input event at the location of the cursor within the display.

* * * * *